United States Patent [19]

Kreske, Jr.

[11] 4,229,482
[45] Oct. 21, 1980

[54] LOLLIPOP AND METHOD OF MAKING SAME

[76] Inventor: Alvin Kreske, Jr., Rte. 5, Box 407, Valparaiso, Ind. 46383

[21] Appl. No.: 916,568

[22] Filed: Jun. 19, 1978

[51] Int. Cl.² ............................................. A23G 3/00
[52] U.S. Cl. ...................................... 426/134; 426/85; 426/104; 426/421; 426/590; 426/592; 426/660
[58] Field of Search .................... 426/85, 110, 104, 90, 426/91, 103, 115, 132, 134, 135, 138, 420, 421, 660, 590, 592

[56] References Cited

U.S. PATENT DOCUMENTS

| | | | |
|---|---|---|---|
| 943,945 | 12/1909 | Liebich | 426/103 |
| 1,254,115 | 1/1918 | Brand | 426/85 |
| 1,623,926 | 4/1927 | Kohler | 426/134 |
| 2,036,706 | 4/1936 | Law | 426/85 |
| 2,617,324 | 11/1952 | Brody | 426/134 |
| 2,766,123 | 10/1956 | Moubayed | 426/134 X |
| 2,867,536 | 1/1959 | Mead et al. | 426/85 |
| 2,901,357 | 8/1959 | Epstein | 426/85 |
| 2,975,925 | 3/1961 | Chambers | 426/85 |
| 3,062,662 | 11/1962 | McDonald | 426/134 |
| 3,545,980 | 12/1970 | Stanger | 426/85 |
| 3,824,322 | 7/1974 | Fiorella | 426/134 |

FOREIGN PATENT DOCUMENTS 2055646 5/1972 Fed. Rep. of Germany ............ 426/90
198282 5/1923 United Kingdom ...................... 426/134

*Primary Examiner*—Steven L. Weinstein
*Attorney, Agent, or Firm*—Burmeister, York, Palmatier, Hamby & Jones

[57] ABSTRACT

A lollipop is made by providing an elongated rigid stick member having an enlarged hollow end portion. Candy material is then formed on the outside of the hollow enlarged end portion of the stick member. A liquid comestible flavoring material is then caused to flow through the open end of the stick member and into the interior of the enlarged end portion. The open end of the stick member is then sealed. In use, as the candy material is consumed, an opening in the enlarged end portion is gradually exposed, the opening either being an existing opening or one formed by biting into and thus rupturing the hollow enlarged end portion. The flavoring material is thus permitted to flow from the hollow stick member for consumption purposes.

9 Claims, 8 Drawing Figures

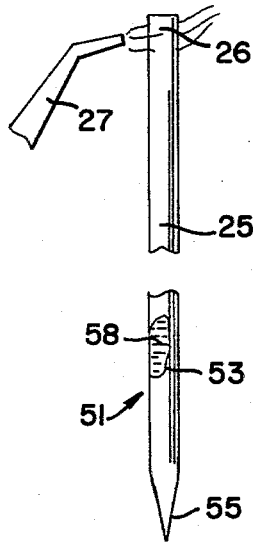
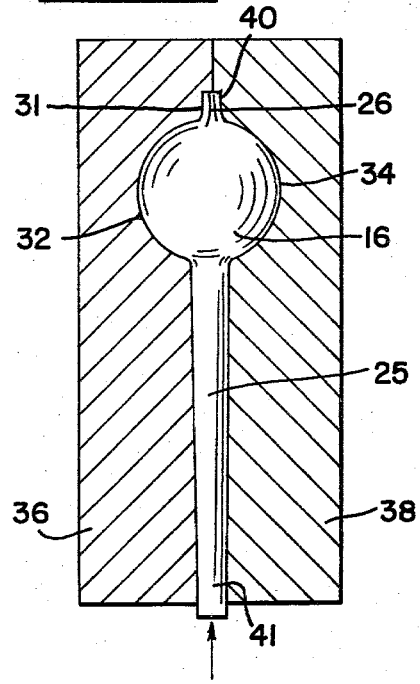
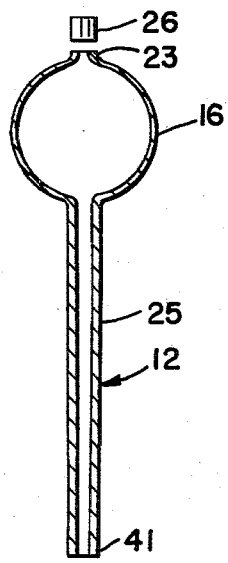
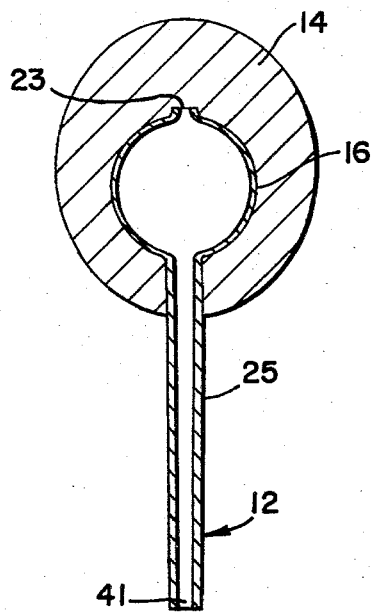
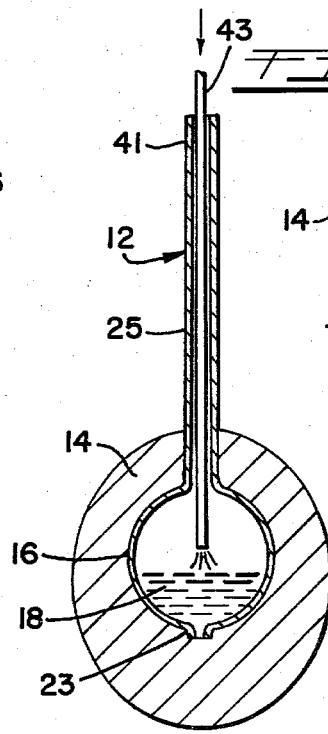
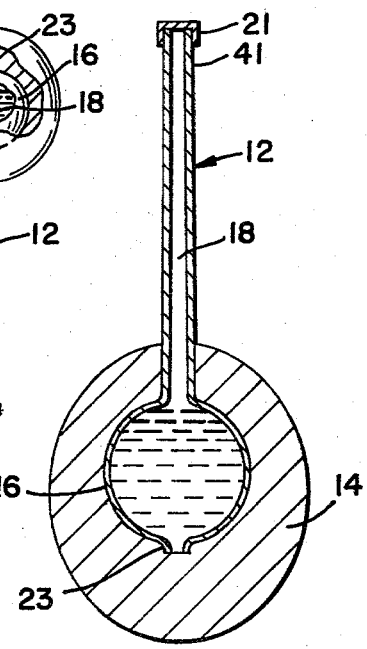

LOLLIPOP AND METHOD OF MAKING SAME

The present invention relates in general to a lollipop and a method of making it, and it more particularly relates to a lollipop containing liquid comestible material and a method of making such a lollipop.

Lollipops and other forms of hard candy have employed different forms of flavoring agents to enhance the enjoyment of the product. For example, reference may be made to U.S. Pat. Nos. 2,121,185; 2,740,720; 2,949,367; 3,062,662; 3,114,642; 3,271,256; 3,325,294; 3,332,783; 3,677,770; and 3,687,691. Flavoring agents have also been added to a stirrer for alcoholic beverages as disclosed in U.S. Pat. No. 3,824,322. While such flavoring additives as disclosed in the foregoing patents may have been entirely satisfactory for some applications, it would be highly desirable to have a lollipop which contains a liquid comestible flavoring material, such as an alcoholic beverage or an effervescent comestible liquid and the flavor and composition of such flavoring material would be preserved for long periods of time for storage purposes. In this regard, for example, it would be desirable to have a lollipop containing an alcoholic beverage, such as liqueur, which beverage would not lose substantial amounts of its alcoholic content and flavor through storage. Also, the alcoholic content of the flavoring beverage would not be diminished substantially during the process of forming the candy portion of the lollipop at conventional high temperatures, which might otherwise cause the boiling off of the alcoholic content of the beverage.

Therefore, it is the principal object of the present invention to provide a new and improved lollipop and the method of making it, which lollipop contains a liquid flavoring material, such as an alcoholic beverage or effervescent beverage, in such a manner that its flavor and composition can be maintained during the high temperature formation of the candy and can be substantially preserved for long periods of time thereafter.

Briefly, the above and further objects of the present invention may be realized by making a lollipop by providing a hollow elongated rigid stick member having an enlarged hollow end portion and having an opposite open end. Hard candy material is then formed on the outside surface of the enlarged hollow end portion. A liquid comestible flavoring material is then caused to flow through the open end of the stick member and into the interior of the enlarged hollow end portion. The open end of the stick member is then sealed, whereby as the candy material is consumed away from the opening, the flavoring material is permitted to exit from the enlarged hollow end portion for consumption purposes, through an opening therein, either initially formed therein or subsequently formed by biting into the enlarged end portion.

These and further objects of the present invention will be understood more fully and completely from the following detailed description when considered with reference to the accompanying drawings, wherein:

FIG. 1 is a pictorial view of a lollipop, which is constructed in accordance with the present invention, and which is shown partly broken away for illustration purposes;

FIGS. 2 through 7 are a series of views of the lollipop of FIG. 1, illustrating various stages of its manufacturing process in accordance with the present invention; and FIG. 8 is a fragmentary view of another lollipop, which is constructed in accordance with the present invention, only a portion of the stick member being shown for illustration purposes.

Referring now to the drawings and more particularly to FIG. 1 thereof, there is shown a lollipop 10, which is constructed according to the present invention. The lollipop 10 generally comprises a hollow stick or tube member 12 and a hollow generally spherical hard candy member 14 formed on the outer surface of a hollow enlarged end portion 16 containing a liquid comestible flavoring material 18, which may be an alcoholic beverage, an effervescent beverage or the like. An end cap 21 seals the stick member 12 to retain the flavoring material 18 therewithin, and an outlet or opening 23 communicating with the interior of the enlarged end portion 16 is disposed at the uppermost surface of the enlarged end portion 16 and permits the flavoring material to flow therefrom as the candy member is dissolved away therefrom during the consumption of the candy member. It will become apparent to those skilled in the art that instead of using the end cap 21, the stick member 12 may be sealed by heating and then crimping the open end of the stick member 12.

In use, the user holds the lollipop 10 by the stick member 12 in a conventional manner and dissolves slowly the upper portion of the candy material 14 in the mouth. As the upper portion of the candy material is consumed, the lollipop is held in a substantially vertical disposition upside down to cause the liquid flavoring material 18 to flow slowly from the interior of the enlarged end portion 16, or alternatively through the perforations (not shown) formed by the teeth of the user when an opening 23 is not employed, to mix with the dissolved portion of the candy material to enhance the enjoyment of the lollipop 10. Since the flavoring material 18 is contained in the sealed stick member 12, the liquid material 18 exits the stick member 12 at a slow rate of speed, since the hollow interior of the stick member 12 is not otherwise vented to the atmosphere. Once the opening 23 is entirely exposed, the user can then merely drink the flavoring material 18 from the interior of the stick member 12.

Referring now to FIGS. 2 through 7 of the drawings, there is shown a process for making the lollipop 10 of FIG. 1 in accordance with the present invention. As shown in FIG. 2 of the drawing, a tube 25 is provided and is composed of suitable rigid thermoplastic material. The tube 25 is hollow throughout its length and open at both of its ends. As shown in FIG. 2 of the drawings, the tube 25 is heated at one of its end portions, such as the end portion 26, by a heating device 27, such as a gas burner or torch, to a molten condition. The tube is heated over its area where the enlarged portion 16 is to be formed subsequently.

As shown in FIG. 3 of the drawings, the tube 25 is then quickly placed within a pair of mating female cavities 32 and 34 of a pair of respective mold members 36 and 38, while the end portion of the tube remains in its molten condition. In this regard, the molten end portion 26 is positioned within the mating cavities 32 and 34, which are generally hemispherical in shape. A pair of confronting shoulder portions 39 and 40 of the respective mold members 36 and 38 cooperate to pinch or crimp together the distal end portion 26 of the tube 25 for the purpose of closing it sealingly. It will become apparent to those skilled in the art that instead of heating the tube 25 prior to inserting it into the mold members, the mold members may be provided with heating elements (not shown) for heating the portion 16 after the tube 25 is placed in the mold member.

As shown in FIG. 3 of the drawings, air under pressure is guided into the opposite open end 41 extending exteriorly of the mold members 36 and 38 to cause the molten portion of the tube 25 to expand and form a bubble which moves into conformity with the internal surfaces of the mold members within the cavities 32 and 34 to form the generally spherically-shaped enlarged end portion 16. For this purpose, it should be understood that the sealed off end 26 facilitates the formation of the bubble, since the air flowing into the tube 25 cannot escape from the end 26. As will become apparent to those skilled in the art, instead of employing air pressure to expand the portion 16, spin molding techniques may be used, and when such techniques are employed, crimping the end of the tube 25 would not be required.

As shown in FIG. 4 of the drawings, the tube 25 is then removed from the mold members 36 and 38 and permitted to cool. Once the tube 25 has cooled sufficiently, the crimped end portion 26 is cut off to expose the opening 23 or it may be left intact where it is desired to have the user perforate it by the teeth of the user. As shown in FIG. 5, the candy material 14 is deposited on the outer surface of the enlarged end portion 16 by conventional techniques.

Once the candy material 14 is permitted to cool, as shown in FIG. 6, the unit is inverted with the open end 41 being on top so that the interior of the enlarged end portion 16 can be filled with the liquid material 18. For this purpose, a small-diameter conduit 43 is inserted within the stick member 12 until the open forward end of the conduit 43 is disposed within the interior of the enlarged end portion 16. The liquid material 18 is then forced under pressure through the upper end (not shown) of the conduit 43 to cause the material 18 to flow through the conduit 43 and into the interior of the enlarged end portion 16.

As the liquid material 18 enters the hollow stick 12, air is displaced therefrom and escapes from the hollow stick 12 in the space between the conduit 43 and the interior of the stick 12. Therefore, the liquid material 18 rises within the stick 12 around the conduit 43 until the level of the liquid material 18 is near the open end 41.

The flow of the liquid material then ceases and the conduit 43 is then withdrawn from the hollow stick member 12. It will be understood by those skilled in the art that the liquid material may also be caused to flow through the conduit 43 under the force of gravity.

As shown in FIG. 7, the end cap 21 is inserted over the open end 41 and sealed in place by any convenient technique, such as heat welding, to retain the liquid material within the hollow stick member 12.

Referring now to FIG. 8, there is shown a lollipop 51, which is constructed in accordance with the present invention, and which is similar to the lollipop 10 except that the lollipop 51 includes a hollow stick or tube member 53 similar to the member 12 but terminating in an end portion 55 which is in the form of a flattened point to serve as a toothpick. The lollipop 51 generally comprises a hollow generally spherical hard candy member (not shown) similar to the member 14 of FIG. 1, formed on a hollow enlarged end portion (not shown) similar to the member 14 of FIG. 1 of the tube member 53, the enlarged end portion being similar to the enlarged end portion 16 of FIG. 1. A liquid material 58 is contained in the tube member 53 in a similar manner as the liquid material 18 of FIG. 1.

In this regard, instead of using the cap 21 to seal the end of the member 12, the end portion 55 is heated and then drawn into the flattened pointed shape as shown in FIG. 8. In this manner, the lollipop 53 serves all of the useful functions as the lollipop 10 with the added advantage of also serving as a toothpick.

What is claimed is:
1. A method of making a lollipop comprising;
providing a hollow elongated liquid tight rigid stick member open at both ends and having an enlarged hollow portion at one end thereof providing a cavity;
covering the entire exterior surface of the enlarged hollow end portion and opening at said one end with a hard candy body, dissolvable in the mouth, thereby sealing the opening at said one end with said body to make the cavity liquid tight;
thereafter displacing the air from the cavity and interior of the stick member with liquid comestible flavoring material by flowing such material through the open other end of the stick member and into the interior of the stick member including the cavity, said stick member and cavity being constructed of a material impermeable to the liquid flavoring material; and
then sealing the open other end of the stick member.
2. A method of making a lollipop according to claim 1, wherein the step of displacing the air with liquid comestible flavoring material includes providing an elongated conduit with a channel extending longitudinally therethrough and inserting said conduit telescopically within the stick member through its open end until the open forward end of the conduit is disposed within the cavity of the stick member, flowing the liquid comestible flavoring material into the conduit and out its open forward end to fill the interior of the cavity and the stick member, and withdrawing the conduit from the tube.
3. A method according to claim 1, wherein the stick member is made by providing a tube composed of thermoplastic material and heating one of its ends, crimping the heated end to seal it off, forcing a fluid under pressure into the open end to expand the tube at its heated crimped end to provide an enlarged cavity, cutting off the heated crimped end to form an opening therein and retaining the enlarged cavity, permitting the heated end to cool, and providing an opening in the tube adjacent to the enlarged cavity.
4. A method according to claim 3, wherein the fluid under pressure consisting of a gas and the step of forcing the fluid under pressure includes providing a mold having a cavity therein and positioning at least a portion of the tube within the cavity of the mold to enable the expanding enlarged portion to move into engagement with the mold to conform to the contour of the cavity.
5. A method according to claim 4, wherein said sealing the open end includes providing an end cap and fitting it over the open end of the stick member, sealing the end cap in place to the stick member over its open end.
6. A method according to claim 1, wherein said liquid comestible flavoring material is one of the group consisting of an alcoholic beverage and an effervescent beverage.
7. A lollipop comprising: an elongated rigid stick member hollow throughout its length, said stick mem- ber having openings at the opposite ends thereof, said stick member having an enlarged hollow end portion disposed at one end thereof forming a cavity communicating with the opening at said one end, means disposed at the end of the stick member opposite the enlarged end portion for sealing the open end of the stick member, said stick member and cavity containing a liquid comestible material therewithin and being constructed of material impermeable to the liquid comestible material, and a member composed of hard candy material, dissolvable in the mouth, disposed about said hollow enlarged end portion and sealably covering said opening thereby providing a liquid tight stick member and enlarged hollow end portion.

8. A lollipop according to claim 7, wherein said liquid comestible flavoring material is one of the group consisting of an alcoholic beverage and an effervescent beverage.

9. A lollipop comprising the combination of claim 7 wherein the hollow stick member is constructed of thermoplastic material.

* * * * *